United States Patent
Cala

[15] 3,687,405
[45] Aug. 29, 1972

[54] FISHING ROD HOLDER

[72] Inventor: James S. Cala, Keithwood Drive, R.D. #3, Valencia, Pa. 16059

[22] Filed: July 14, 1970

[21] Appl. No.: 54,752

[52] U.S. Cl. ................... 248/44, 248/156, 248/316 B
[51] Int. Cl. ........................................... A01k 97/10
[58] Field of Search .......... 248/38, 40, 42, 43, 44, 84, 248/85, 86, 87, 156

[56] References Cited

UNITED STATES PATENTS

| | | | |
|---|---|---|---|
| 2,981,509 | 4/1961 | Messenger et al. | 248/42 |
| 658,452 | 9/1900 | Mills | 248/88 |
| 2,204,692 | 6/1940 | Parisa | 248/88 X |
| 3,473,770 | 10/1969 | Edgerton | 248/156 X |
| 1,691,155 | 11/1928 | Howell | 248/316 B |

FOREIGN PATENTS OR APPLICATIONS

| | | | |
|---|---|---|---|
| 1,311,952 | 11/1962 | France | 248/156 |

*Primary Examiner*—William H. Schultz
*Attorney*—Linton & Linton

[57] ABSTRACT

The fishing rod holder has a pointed end shaft having a medial side foot rest to assist in pushing said pointed end into the ground, a laterally extending L-shaped opposite end portion with a grooved free end and a clamp mounted on said laterally extending end portion whereby a fishing rod handle can be laid on said grooved free end and detachably retained by said clamp in order that the fishing rod will be held in a position extending from said groove free end when in use.

2 Claims, 5 Drawing Figures

Patented Aug. 29, 1972
3,687,405
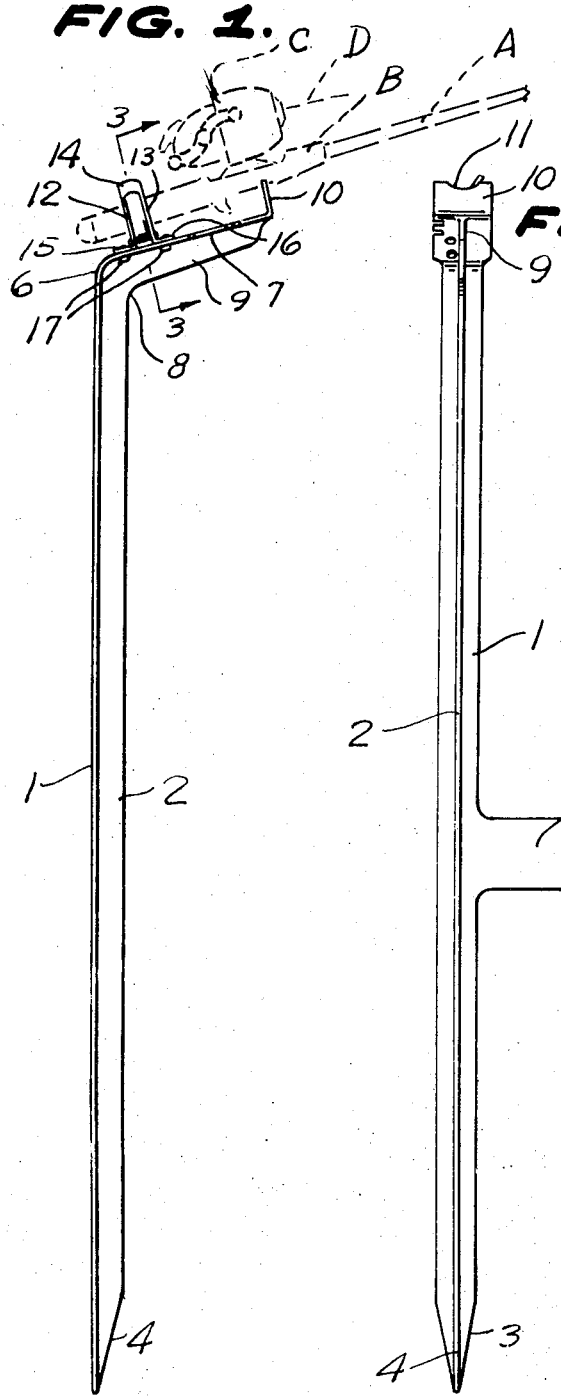
FIG. 1.
FIG. 2.
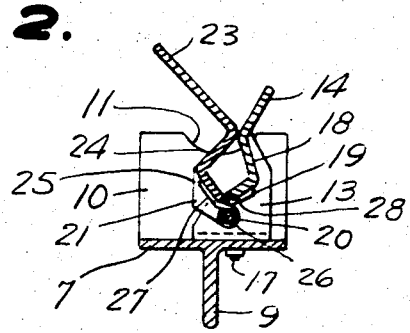
FIG. 3.
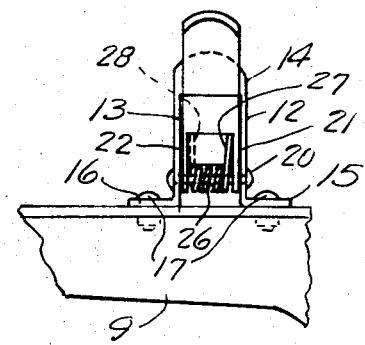
FIG. 4.
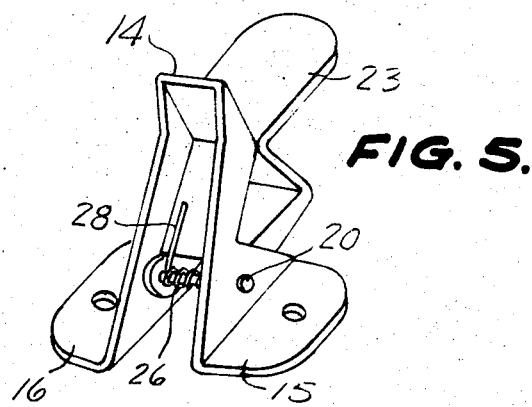
FIG. 5.
INVENTOR.
JAMES S. CALA,
BY
Linton and Linton
ATTORNEYS.

FISHING ROD HOLDER

The present invention is concerned with a fishing rod holder.

The principal object of the invention is to provide a fishing rod holder that can be readily inserted in a supporting surface, such as the ground and a fishing rod handle quickly and easily detachably retained on the uppermost portion of the holder so that the fishing rod would extend out over water when fishing therewith.

A further important object of the invention is to provide an upright support for a fishing rod capable of detachably retaining the handle of the fishing rod with the fishing rod extending laterally of said upright support and with the fishing rod reel free from obstructions so that it may be used by the fisherman to reel in the fishing line when desired.

Other objects of the invention will be in part obvious and in part pointed out in the following detailed description of the accompanying drawing, in which, FIG. 1 is a side elevation of the fishing rod holder as in use, FIG. 2 is a front view taken from the right of FIG. 1, FIG. 3 is an enlarged cross-sectional view taken on line 3—of FIG. 1, FIG. 4 is an enlarged side view of the clamping portion of the holder taken from the opposite side thereof to FIG. 1, and, FIG. 5 is an enlarged perspective view of the clamping portion of the holder corresponding to FIG. 1.

Referring now more particularly to the accompanying drawing in which like and corresponding parts are designated by similar reference characters, A indicates a conventional fishing rod having a handle B, reel C, and fishing line D.

The fishing rod holder has an elongated shaft 1 with a longitudinal rib 2 extending normal to said shaft. Shaft 1 has a V-shaped end 3 and rib 2 has a corresponding inwardly slanting end portion 4 providing a pointed end.

A foot rest 5 extends laterally from a side medial portion of shaft 1.

Shaft 1 is bent at 6 so that its end portion 7 extends laterally on a slant therefrom providing a support and the rib is correspondingly bent at 8 to extend at 9 beneath end portion 7. The free end portion 10 of shaft 1 is bent to extend normal to end portion 7 and has an end groove 11.

A clamp 12-28 has an inverted U-shaped jaw 12-18 including a side plate 12, a second side plate 13 and a front plate 14 extending between and connecting said side plates. Side plate 12 has a lateral end portion 15 and side plate 13 a lateral end portion 16. End portions 15 and 16 are attached by bolts, rivets or the like 17 to the upper faces of shaft end portion 7. Side plate 14 has as is best shown in FIG. 3, a V-shaped lower portion provided by medial portion 18 diverging inwardly from the top portion of said plate and a lower portion 19 diverging outwardly from medial portion 18. Plates 12 and 13 have their edges on which side plate 14 is connected shaped to correspond to said side plate. Said jaw 12-18 can be of one piece of material or separate pieces attached together as by welding.

A pin 20 extends through side plates 12 and 13 and has its outer ends riveted.

A second clamp jaw 21-23 has spaced apart legs 21 and 22 extending between side plates 12 and 13 and with pin 20 also extending therethrough pivotally connecting the second jaw to the first jaw. Front plate 23 has a lower V-shaped portion provided by medial portion 24 extending on an inward slant from the top portion and a bottom portion 25 extending outwardly on a slant from said medial portion 24. Bottom portion 25 extends between and connects legs 21 and 22. Said jaw 21-23 can be of one piece of material or separate pieces attached together as by welding. The portions 24 and 25 are opposite to portions 18 and 19, respectively, of the first jaw and spaced therefrom a distance sufficient to hold a section of a fishing rod handle B therebetween.

A coil spring 26 surrounds pin 20 and has a leg 27 bearing against the back of side plate 23 and a second leg 28 bearing against the back of side plate 14, tending to hold side plate 23 towards side plate 14.

As an example of the present fishing rod holder, shaft 1 may be straight and 3 feet long from point 2 to bend 6, 1¼ inches wide and one-eighth of an inch thick. End portion 7 can be 6 inches long and 2 inches wide with free end portion 10 1¼ inches long. Bend 6 can have an inner angle of 100°. Foot rest 5 can be 3 inches long and 2 inches wide. The entire shaft 1-10 can be of one piece of material such as metal, plastic or wood. However the holder can be of other dimensions as may be found desireable.

In the use of the present fishing rod holder, point 3-4 is inserted in a supporting surface such as the ground, beach or the like where it is desired to fish and the user's foot placed on foot rest 5 and used to push shaft 1 into said supporting surface until the shaft will remain upright.

Side plate 23 is manually pivoted from side plate 14, handle B placed with a section between said side plates which are then released and spring 27 will push side plate 23 against handle B to hold the same between said side plates. Another section of handle B is laid on groove 11 at the same time and thus rod A will extend out over water to support line D in said water for fishing. Reel C can be operated easily and readily to reel in line D when desired.

I claim:

1. A fishing rod holder comprising a shaft having a flat side and a rib extending normal to and longitudinally of said flat side, said shaft having an elongated straight portion, a pointed end and a support portion extending at an angle to said straight portion with said rib on one side of said support portion, said shaft support portion having a free end section extending normal thereto in an opposite direction to said rib, said end section having a notch in the end thereof, an inverted U-shaped clamp jaw having lateral end portions attached to a second side of said shaft support portion opposite to said rib with said jaw lateral end portions extending longitudinally of said support portion, a second clamp jaw pivotally mounted on said first jaw and capable of being pivoted laterally of said support portion and resilient means tending to hold said jaws together whereby a fishing rod handle can be detachably gripped between said clamp jaws and said fishing rod rest on said free end notch for being supported when said shaft pointed end is inserted in a supporting media.

2. A fishing rod holder as claimed in claim 1 wherein said jaws have opposing sinuous faces.

* * * * *